US 8,744,678 B2

United States Patent
Becher et al.

(10) Patent No.: US 8,744,678 B2
(45) Date of Patent: Jun. 3, 2014

(54) APPARATUS AND METHOD FOR SELECTIVELY RESTRICTING OR DISABLING ELECTRONIC DEVICE FUNCTIONALITY

(71) Applicant: SRRS, LLC, Fort Wayne, IN (US)

(72) Inventors: James A. Becher, Fort Wayne, IN (US); Donald R. Ross, Fort Wayne, IN (US); Paul J. Smith, Fort Wayne, IN (US)

(73) Assignee: SRRS, LLC

( * ) Notice: Subject to any disclaimer, the term of this patent is extended or adjusted under 35 U.S.C. 154(b) by 0 days.

(21) Appl. No.: 13/741,239

(22) Filed: Jan. 14, 2013

(65) Prior Publication Data

US 2013/0184933 A1    Jul. 18, 2013

Related U.S. Application Data

(60) Provisional application No. 61/586,376, filed on Jan. 13, 2012, provisional application No. 61/663,004, filed on Jun. 22, 2012, provisional application No. 61/684,427, filed on Aug. 17, 2012.

(51) Int. Cl.
*G01M 17/00* (2006.01)
*G06F 19/00* (2011.01)

(52) U.S. Cl.
USPC .............. 701/36; 701/29.7; 701/33.2

(58) Field of Classification Search
USPC ............ 701/36, 29.7, 33.2, 34.4, 29.2; 73/114.36
See application file for complete search history.

(56) References Cited

U.S. PATENT DOCUMENTS

| | | | |
|---|---|---|---|
| 5,032,828 A | 7/1991 | Hirose et al. | |
| 5,949,345 A | 9/1999 | Beckert et al. | |
| 6,122,682 A | 9/2000 | Andrews | |
| 6,266,589 B1 * | 7/2001 | Boies et al. | 701/36 |
| 6,574,531 B2 | 6/2003 | Tan et al. | |
| 6,668,221 B2 | 12/2003 | Harter, Jr. et al. | |
| 6,892,116 B2 | 5/2005 | Geisler et al. | |
| 7,064,656 B2 | 6/2006 | Belcher et al. | |
| 7,640,101 B2 * | 12/2009 | Pair et al. | 701/431 |
| 7,983,840 B2 | 7/2011 | Pair et al. | |

(Continued)

OTHER PUBLICATIONS

IP Controls, LLC dba Innovative Products Company; "Laptop Computers in the Mobile Workforce"; White Paper Original Highlights 20IPC 20 Logo.

(Continued)

*Primary Examiner* — Tan Q Nguyen
(74) *Attorney, Agent, or Firm* — George Pappas

(57) ABSTRACT

An apparatus that restricts or disables electronic device functionality based on vehicle status data received from the on-board computer ("OBD") of a public service vehicle. In some embodiments, the vehicle status data is accessed from the OBD through an assembly line diagnostic link ("ALDL") connector, which eliminates any need for modification of the vehicle during installation. If the software determines the vehicle status data is outside a preset range, which could be customized on a case-by-case basis, the on-board computer of the vehicle could be restricted or disabled until the vehicle status data returns to within the preset range.

20 Claims, 12 Drawing Sheets

(56) References Cited

U.S. PATENT DOCUMENTS

| | | | |
|---|---|---|---|
| 8,019,505 B2 | 9/2011 | Schofield et al. | |
| 8,270,933 B2* | 9/2012 | Riemer et al. | 455/345 |
| 8,280,438 B2* | 10/2012 | Barbera | 455/557 |
| 8,306,551 B2* | 11/2012 | Lesyna | 455/456.1 |
| 2005/0182535 A1* | 8/2005 | Huang | 701/29 |
| 2006/0217855 A1* | 9/2006 | Chinnadurai et al. | 701/29 |
| 2011/0009107 A1 | 1/2011 | Guba et al. | |
| 2011/0100105 A1* | 5/2011 | Bauerle et al. | 73/114.36 |
| 2012/0041633 A1* | 2/2012 | Schunder et al. | 701/29.2 |

OTHER PUBLICATIONS

VuLock Software, "Mobile Mounts," http://www.mobilemounts.biz/product-solutions/vulock-software.

T3 Transport Technology Today; Sep. 2004.

LockOutPro Motion Activated Safety Controller; Innovative Products Co.

IPC, Driving GPS Solutions; Innovative Products Co.

BlackOutPro, Motion Activated Safety Controller, Innovative Products Co.

* cited by examiner

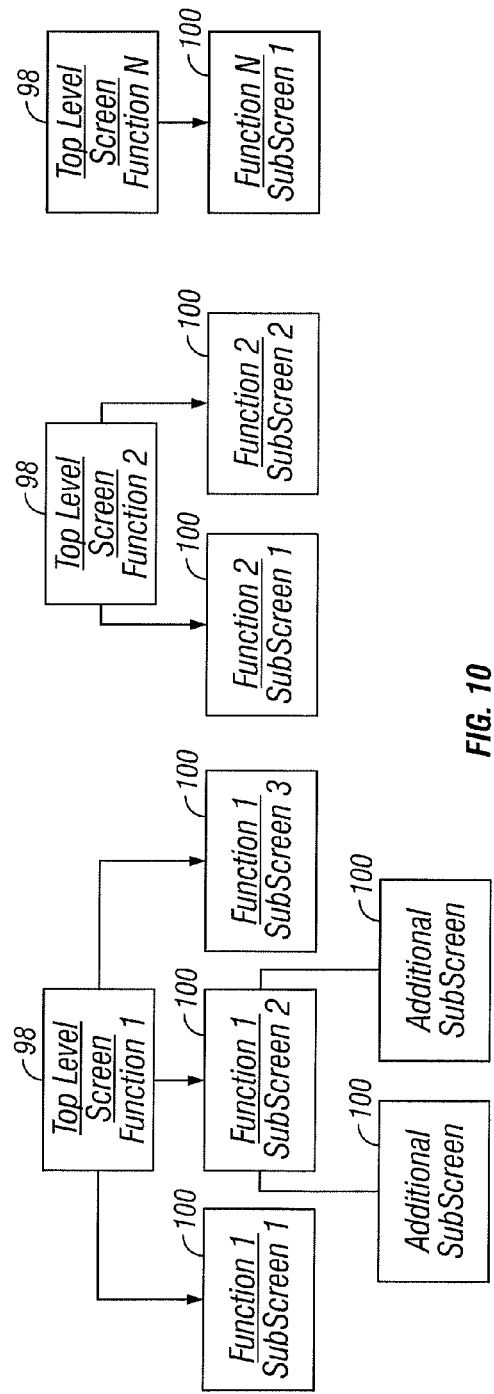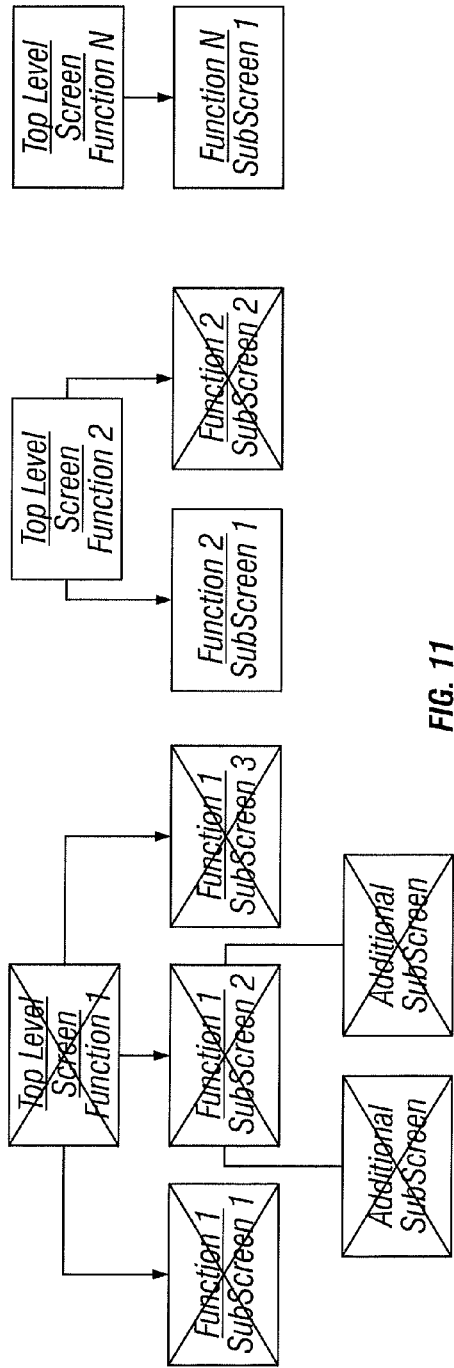
FIG. 10
FIG. 11

APPARATUS AND METHOD FOR SELECTIVELY RESTRICTING OR DISABLING ELECTRONIC DEVICE FUNCTIONALITY

RELATED APPLICATIONS

The present application is related to and claims priority to U.S. Provisional Patent Application Ser. No. 61/586,376, filed on Jan. 13, 2012, entitled "Apparatus and Method for Selectively Enabling or Disabling Computer Input Device," U.S. Provisional Patent Application Ser. No. 61/663,004, filed on Jun. 22, 2012, entitled "Apparatus and Method for Selectively Restricting or Disabling Electronic Device Functionality," and U.S. Provisional Patent Application Ser. No. 61/684,427, filed on Aug. 17, 2012, entitled "Apparatus and Method for Selectively Restricting or Disabling Electronic Device Functionality." To the extent not included below, the subject matter disclosed in those applications is hereby expressly incorporated into the present application in its entirety.

TECHNICAL FIELD

The present disclosure relates generally to electronic devices, and more specifically to the use of computers, cell phones, and personal digital assistants (pda's) in public service vehicles and privately owned vehicles. (For the purpose of this application, the term "cell phone" will also encompass pda's.) Throughout this application, the disclosures focus mainly on the use of computers and cell phones in law enforcement, land transportation but are just as appropriately applied to other modes of transportation and to civilian or military use.

BACKGROUND AND SUMMARY

It has become commonplace in many states, municipalities, and jurisdictions to equip public service vehicles, such as police cars, with computers and cell phones. For example, in the case of a police car, a computer may be provided on a stand or docking station mounted in the front seat area of the vehicle. The computer is typically provided with a display and a keyboard, or other input device, and is positioned so as to be readily accessible to the driver. Such computers are used to communicate information to an officer via the display, and to allow the officer to request information from remote sources. For example, police officers can search records relating to automotive vehicle registrations and license numbers, readily access directions and online street maps, enter information regarding traffic citations, and perform other tasks that are important, if not essential, in the performance of their duties.

In the case of cell phones, they typically have a display and a keyboard or touch screen capability for receiving and sending information. With many of today's devices, the officer can communicate via voice, e-mail and text-massaging, browse the Internet, access and update personal organizer information, and access and interact with many other functions and applications (e.g. app's). The use of these features may or may not be in the course of performing their professional duty.

While the ready availability and access to a computer and cell phone is of great benefit to mobile police officers and other public service workers, there can be risks associated with the use of such technology. If the driver of a vehicle equipped with a computer, or cell phone, or both, attempts to enter or request information via the device while driving the vehicle, a dangerous situation may be created. Such instances of "distracted driving" have been known to cause officer-involved vehicle accidents. Accordingly, there exists a need for systems and methods of operating electronic communication devices inside a vehicle so as to prevent or minimize the risks associated with the use of such devices, particularly as those risks relate to the use of input devices, such as keyboards and touch screens, and cell phones.

The present disclosure is directed to apparatus and methods for selectively disabling and enabling electronic devices (e.g., a keyboard, touch screen, and cell phones) and/or restricting functionality of a vehicle-mounted computer in predetermined circumstances.

In certain embodiments, the computers (or other functionality) are selectively disabled or restricted when the vehicle is in motion. Other aspects of the computer's operation are unaffected. In the case of cell phones, all functionality could be disabled in some embodiments. For example, in such embodiments the display device will continue to function and provide current updates of information. The computer's processor and memory elements will continue to function so as to process and store information received on an ongoing basis. However, when the vehicle is in motion (i.e., when the driver is operating the vehicle), the keyboard, touch screen and/or other selected input devices are selectively disabled and cannot be used by the driver to enter information into the computer. In some cases, certain software functionality could be restricted or "locked-out" while the vehicle is in motion and the input devices could remain fully functional.

In one embodiment, (described in additional detail below), a detector mechanism is provided to determine when the gear shift lever of the vehicle is in the "Park" position. When the gear shift lever is in the "Park" position, the selected input devices on the computer are enabled for use by the vehicle driver. However, when the vehicle gear shift lever is taken out of the Park position, the selected input devices are disabled and may no longer be used.

Other methods or mechanisms for detecting that the vehicle is in motion may be used. For example, radar or some other motion detector may be fitted in the vehicle to detect vehicle motion which, in turn, causes the selective disabling/restriction of electronic devices. Motion of the vehicle may also be detected by monitoring a change in GPS (global positioning satellite) coordinates of the vehicle. A number of different types of proximity switches, limit switches, and similar devices may also be used to detect the fact that the vehicle is being operated by the driver, or that other conditions exist which merit selectively disabling the input devices or restricting functionality.

In some embodiments, the use of on-board vehicle diagnostic data, such as an assembly line diagnostic link ("ALDL") connector, could be used to determine when the vehicle is in motion. The use of the on-board vehicle diagnostic system information through the ALDL connector is a preferred method for controlling electronic devices, especially where the disabling of the cell phone is desired concurrent with the control of the vehicle's computer's functionality.

Provisions may also be made for bypassing or defeating the system to allow the input devices to be enabled under certain conditions, including possible emergency conditions. For example, a vehicle accident or mechanical malfunction may prevent a vehicle from being shifted into park, yet leave the computer able to function normally. In such an instance, the system described below can be readily overcome by an officer or other authorized personnel to allow full access to and use of the computer.

In some embodiments, police cars or other public service vehicles can be fitted with an apparatus embodying the concepts of the present disclosure without modifications to the electrical or mechanical systems of the vehicle. This substantially reduces or prevents the possibility that such apparatus may reduce the reliability of, or otherwise compromise, normal vehicle operation. However, while this aspect of the disclosure is advantageous and preferred, it is possible that indicators generated by the vehicle's mechanical and/or electrical systems could be used in embodiments of the subject system and method. It is also possible that original equipment manufacturers could specifically incorporate this capability into the vehicle at the time of manufacture. In either event, such embodiments would be considered to fall within the scope and spirit of the present disclosure.

Additional embodiments, features and advantages will become apparent to those skilled in the art upon consideration of the following description of the illustrated embodiment exemplifying the best mode of carrying out the invention.

BRIEF DESCRIPTION OF THE DRAWINGS

The present disclosure will be described hereafter with reference to the drawing figures which are given as non-limiting examples only, in which:

FIGS. 10-11 illustrate the possibility of restricting certain functionality while the vehicle is in motion.

DETAILED DESCRIPTION OF THE DRAWINGS

Figure 1:
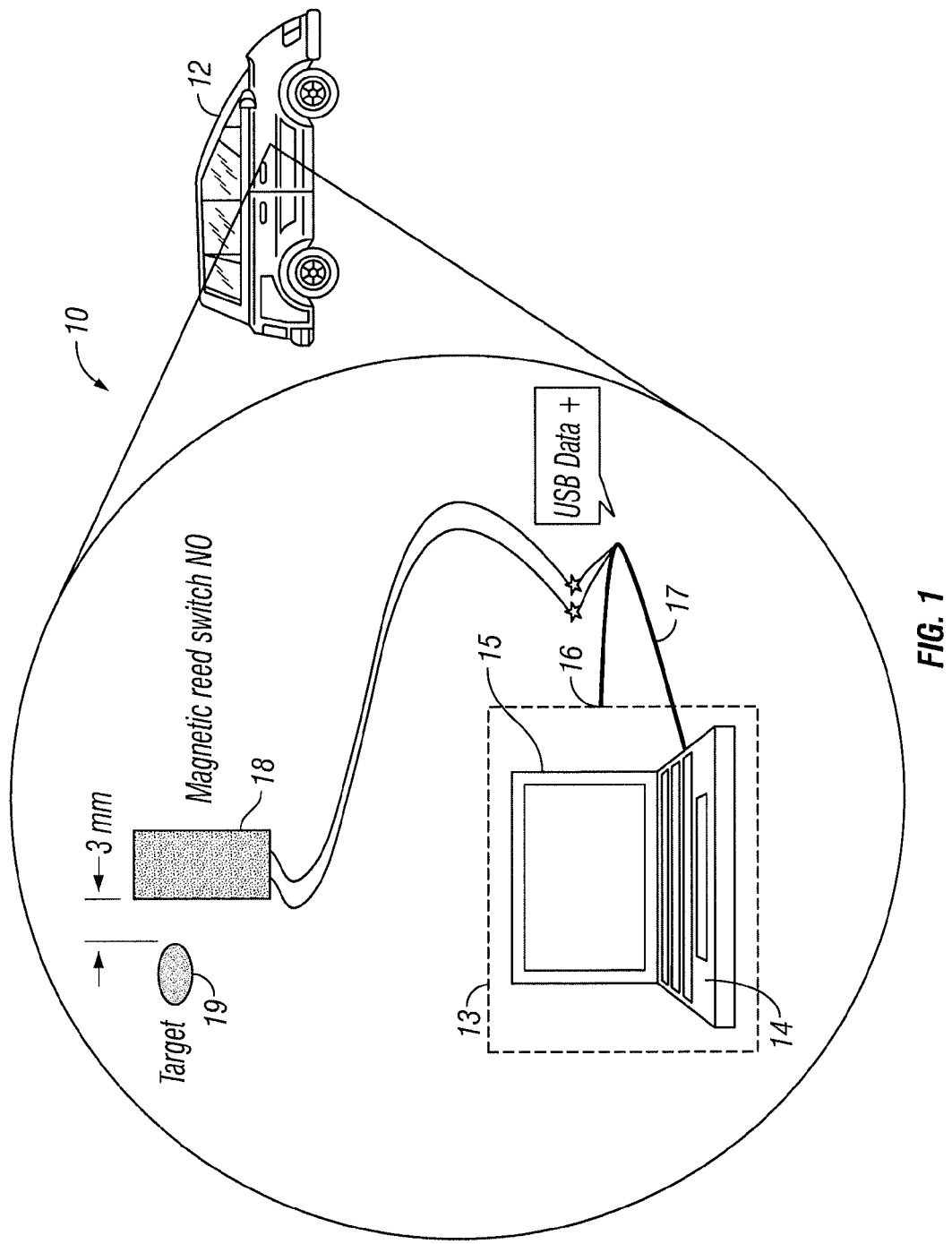
FIG. 1 shows an exemplary embodiment of the present invention.

FIG. 1 shows an exemplary embodiment 10 of the present invention. Illustrated in FIG. 1 is a vehicle 12 which is equipped with a computer 13. Computer 13 includes at least one input device, such as keyboard 14, and an output device, such as display 15. Keyboard 14 is connected to computer 13 by a USB cable 17 which plugs into USB port 16 of computer 13. Vehicle 12 could be, for example, a police car.

In this embodiment, a detector 18, is disposed adjacent a target 19. Detector 18 may be, for example, a normally-open, magnetic reed switch. In one embodiment of the invention, target 19 is a ferrous component of the vehicle's transmission linkage. Detector 18 is disposed relative to target 19 such that when the transmission is in the Park position, the contacts of detector 18 close. The respective contacts of detector 18 are serially connected to a wire in cable 17. Specifically, detector 18 is connected in series with 5V or ground wire of cable 17 such that the 5v or ground connection is "closed" when the contacts of detector 18 are closed, and "open" when the contacts of detector 18 are open. When the 5V or ground connection is closed, the keyboard is in the "present" state, (i.e., is fully connected to USB port 16 of computer 13). When the contacts of detector 18 open, opening the 5V or ground wire, a software module running on the computer detects the fact that the keyboard is no longer connected or "present." As discussed below, the software module may then disable or restrict a touch screen or other functionality, as desired.

More specifically, in an exemplary embodiment of the invention, when the transmission of vehicle 12 is in the Park position, target 19 comes in close proximity (e.g., approximately 3 mm) of detector 18 which may be a normally-open magnetic reed switch. The proximity of target 19 causes the contacts of detector 18 to close. The closing of the contacts of detector 18 completes the connection of the 5V or ground wire in USB cable 17 to fully connect keyboard 14 to USB port 16 of computer 13. Software running on computer 13 detects the presence (or absence) of keyboard 14. The software may then selectively enable/disable a touch screen or other selected devices in response to the condition of the contacts of detector 18.

Figure 2:
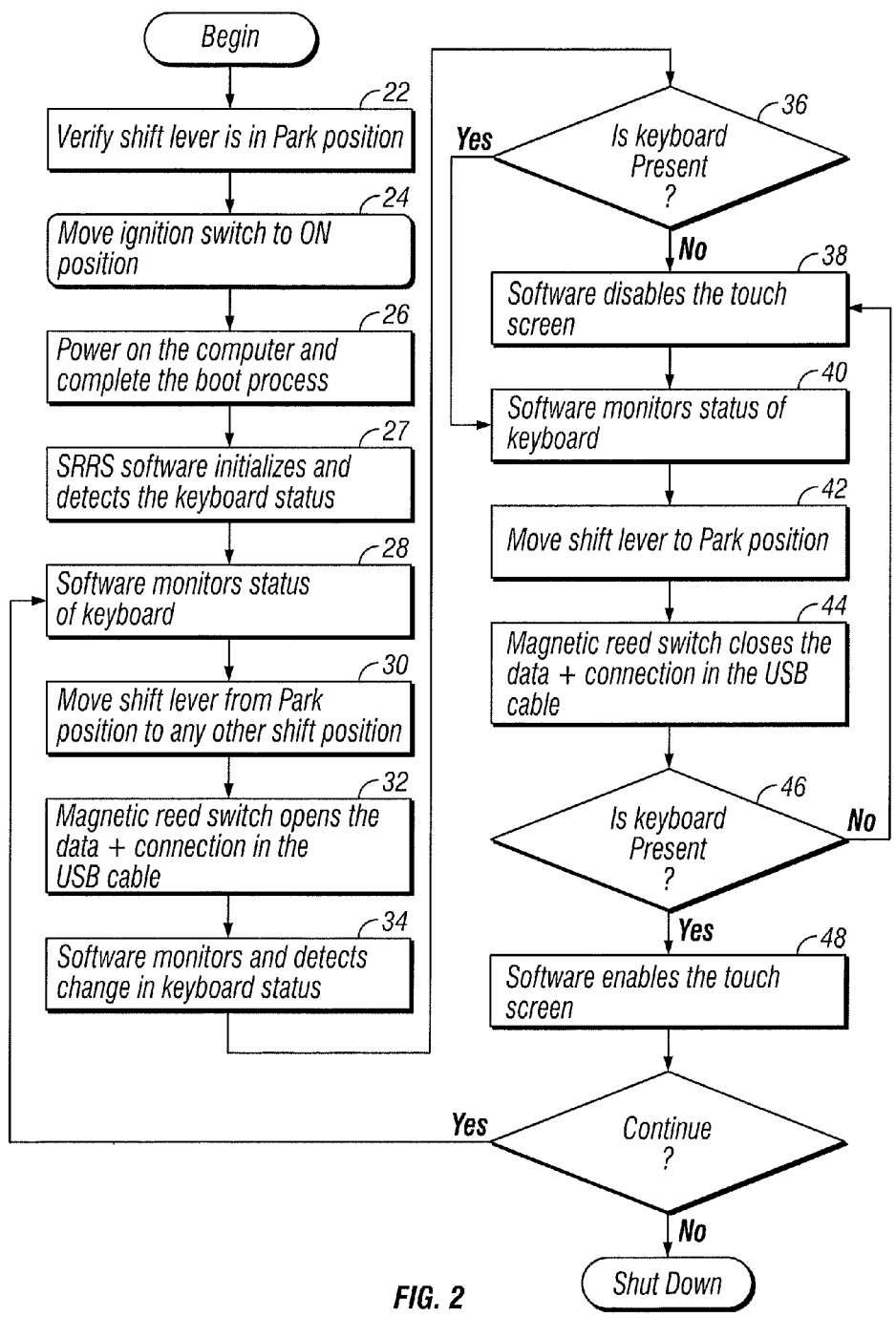
FIG. 2 is a flow chart which illustrates the method and operation of a program module associated with the present invention.

FIG. 2 shows a flow chart which illustrates the method and operation of a program module associated with the present invention. More generally, the flow chart of FIG. 2 illustrates the overall operation of certain aspects of the invention, including a software module installed on computer 13. With reference to FIG. 2, the method begins with the shift lever of vehicle 12 in the Park position (block 22). The ignition switch is moved to the On position (block 24) which provides power to computer 13 and initiates a boot process (block 26). A program module designed to monitor the status of keyboard 14 and to cause selective enabling/disabling of a touch screen and/or other selected input or output devices initializes and detects the keyboard status (block 27). The program module runs continuously in the background to monitor the status of keyboard 14. (block 28). When the shift lever is moved from the Park position to any other shift position (block 30), the contacts of detector 18 open, opening the 5V or ground connection in USB cable 17 (block 32). The program module detects this change and resets the keyboard status from "present" to "not present" (block 34). The program module continues to monitor the keyboard status to determine if the keyboard is present (decision operation 36). If the keyboard status is "not present," the software disables the touch screen (if provided) and/or any other devices designated (block 38). The program module then continues to monitor the status of the keyboard (block 40).

When the shift lever is returned to the Park position (block 42), the contacts of detector 18 close, completing the 5V or ground connection (block 44). The program module detects the presence of the keyboard (decision operation 46) and selectively enables the touch screen or other designated devices (block 48). The program module is a program in Microsoft Windows™. The program module utilizes the DevCon (Device Console) utility provided by Microsoft to search for and manipulate devices within a computer. DevCon can be used to selectively enable, disable, install, configure, and remove devices on a local computer. The program module which monitors the presence of keyboard 14 can, using the DevCon utility, selectively enable/disable selected input or output devices or restrict functionality in response to a change of state of the contacts of detector 18, as discussed above.

In one embodiment, only input devices, such as a keyboard or a touch screen, are selectively enabled/disabled in response to a condition of the vehicle. Other functions, such as the display, are unaffected and continue to operate normally. However, such other functions may also be selectively enabled/disabled or restricted, if desired. For example, the display may be selectively disabled under certain operating conditions to avoid distracting the vehicle operator, or to maintain confidentiality of the information being displayed under certain circumstances (e.g., while a vehicle is undergoing routine maintenance or repairs). Likewise, certain software functionality could be restricted while the vehicle is in motion, as shown in FIG. 10.

It should further be noted that provisions are preferably made to allow an officer or other authorized personnel to overcome or override the system in appropriate situations. For example, an override feature may be provided to complete the connection of keyboard 14 to computer 13, regardless of the state of the contacts of detector 18. However, a tamper-indicating seal may be provided to detect use of the override when emergencies or extenuating circumstances do not exist. However, in the event of an emergency, the seal can be broken and the override employed to allow the user full access to the computer. The occurrence of such an event will be apparent from the condition of the seal which will preferably be inspected on a regular basis. Provisions may also be made to remotely disable the system by, for example, remotely interrupting operation of the program module monitoring the status of the keyboard to allow access to a touch screen or other device.

It is also possible that "laptops" or "notebook" computers may also be used in public service vehicles, such as police cars or ambulances. The ability to interrupt the connection of the keyboard to such a device is not as readily available, since the keyboard is internally connected to the other computer components. However, modification of the computer in this regard is possible to provide a connection point for the contacts of detector 18 (or other motion sensing detector). In such case, the apparatus and method described above could be used as described with a laptop computing device.

Figure 3:
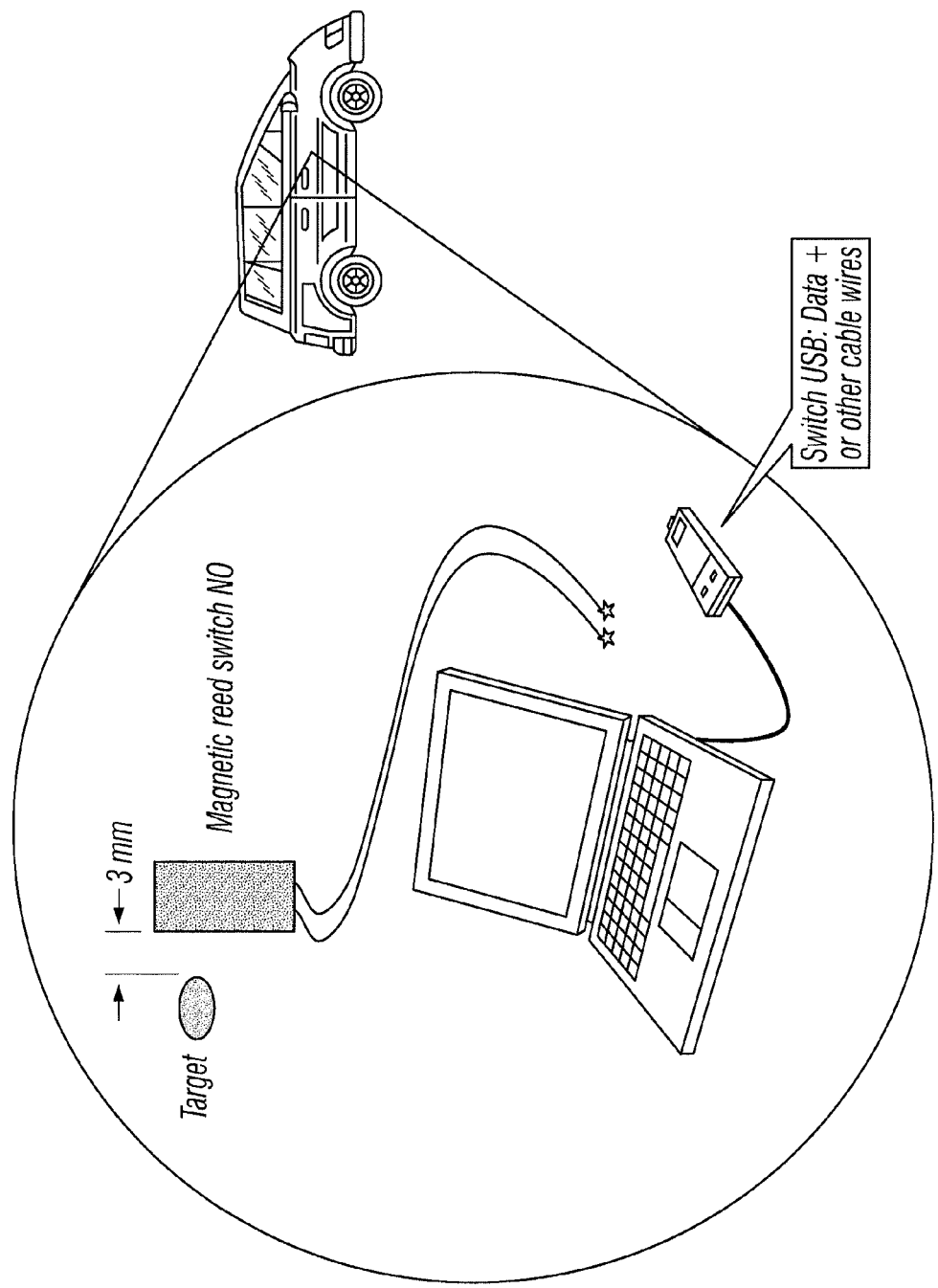
FIG. 3 shows an alternative embodiment of the invention.
Figure 4:
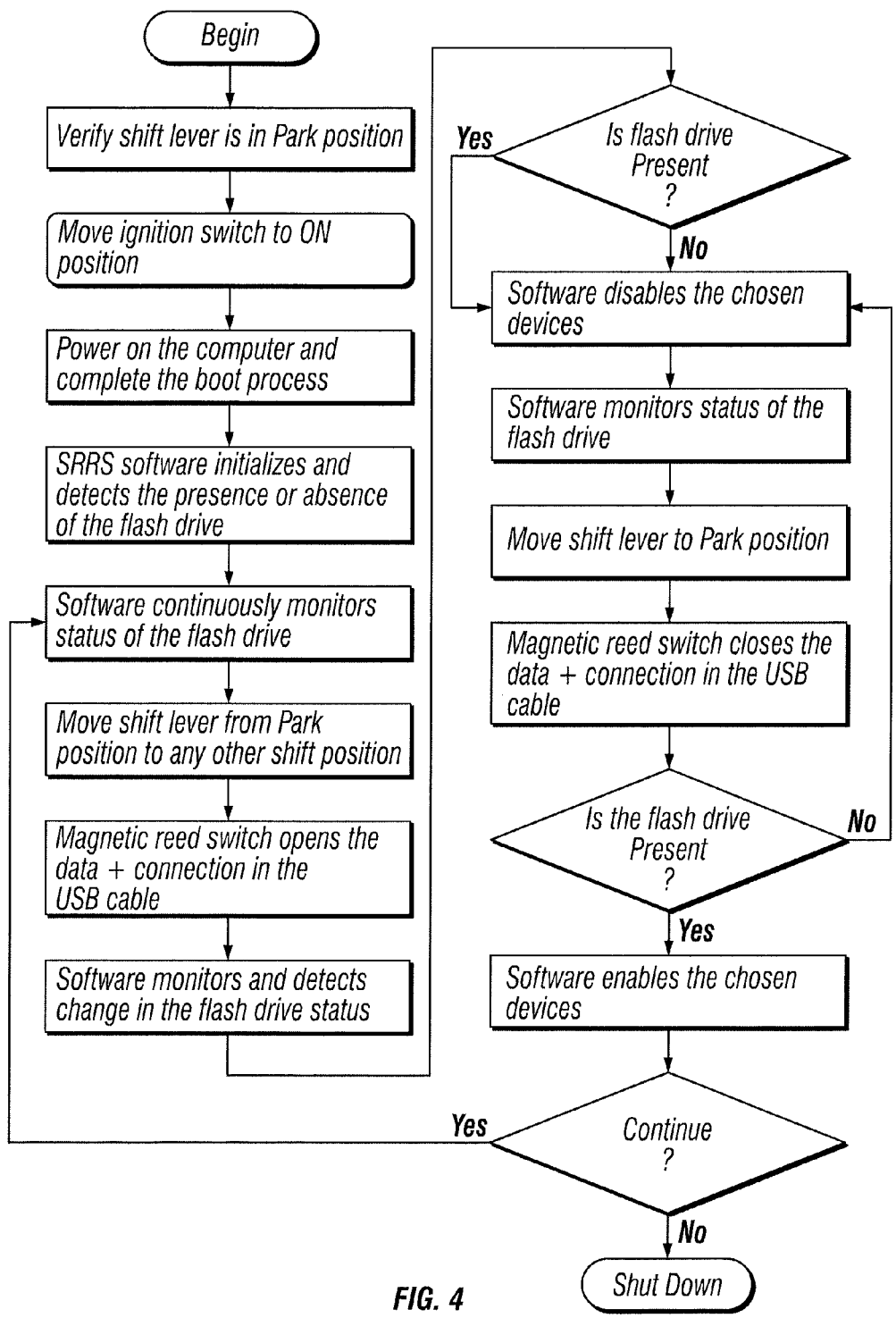
FIG. 4 is a flow chart which illustrates the method and operation of the alternative embodiment of FIG. 3.

Alternatively, a memory device, such as a flash drive or dongle may be provided and connected to a USB port of the laptop computer by USB cable. The flash drive or dongle will have in its memory a serial number or other identifier. When the software module on the laptop initializes, the software will verify that the flash drive or dongle is present (i.e., connected to the USB port) and that the serial number or other identifier is correct. Only after detection and identification of the flash drive or dongle will the software complete initialization and allow the computer to operate. When the connection to the flash drive or dongle is interrupted (e.g., by the opening of contacts in a detector such as described above, or by other means) selected devices, such as a keyboard and/or touch screen, will be disabled. When connection to the flash drive or dongle is restored, such devices will be enabled. FIG. 3 shows an exemplary illustration of such an alternative system. FIG. 4 further illustrates the method and operation of the embodiment of FIG. 3.

Figure 5:
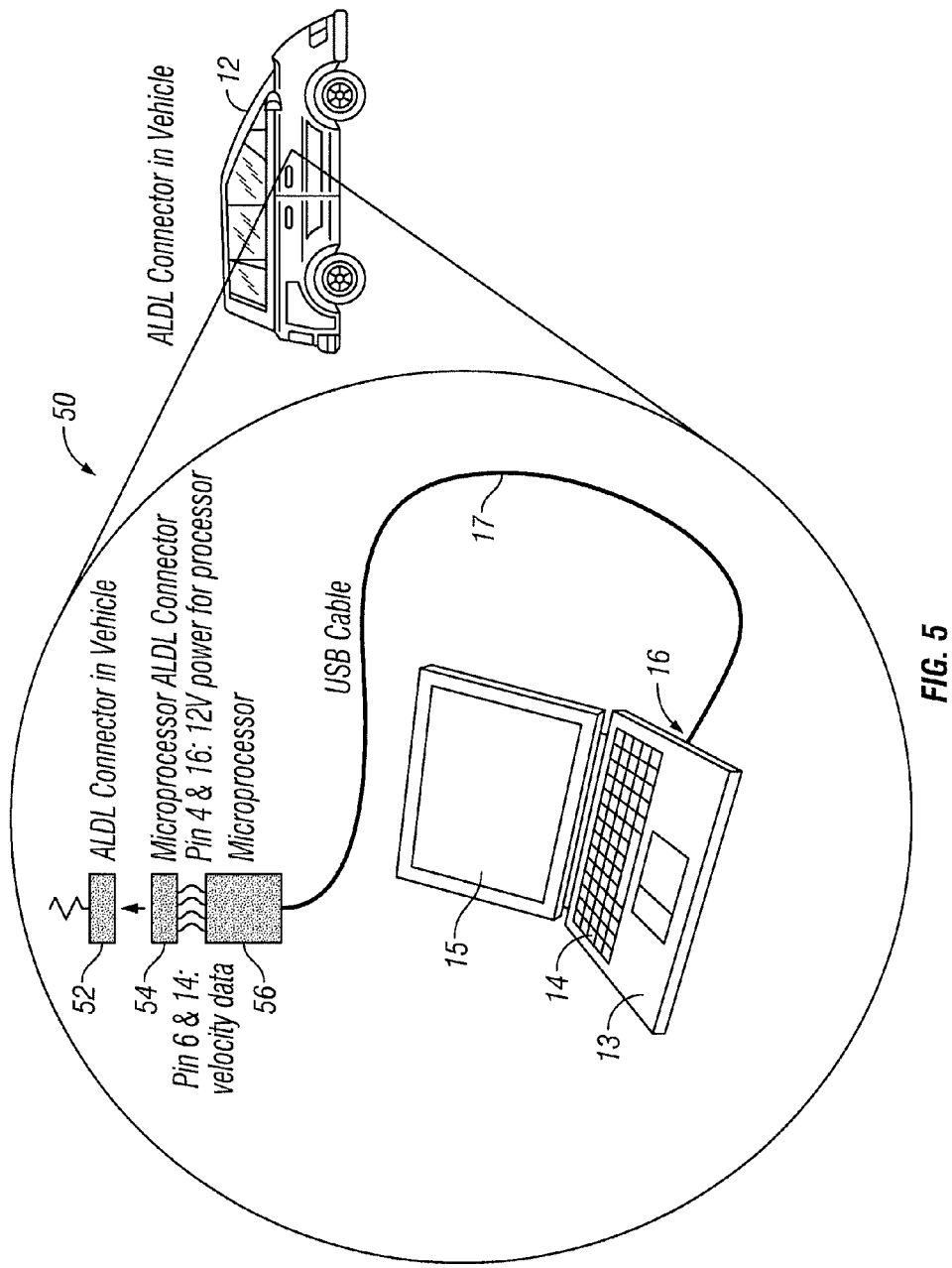
FIG. 5 shows another alternative embodiment of the invention.

FIG. 5 shows an alternative embodiment 50 in which input/output devices and/or functions of the software running on the on-board computer are disabled or restricted based on the detection of vehicle movement or speed. In one embodiment, vehicle movement could be detected, for example, using an on-board diagnostic vehicle output, such as Assembly Line Diagnostic Link ("ALDL"), to provide speed data. Although the ALDL is shown for purposes of example, other devices for detecting vehicle movement could be used. When the vehicle is moving based on the speed data provided by the ALDL, certain input/output devices and/or functionality of the software could be disabled or restricted. Typically, the specific functionality and/or input/output devices that are disabled or restricted are selected prior to installation. In this manner, the restrictions on input/output devices and functionality that the software places on the on-board computer could be selected based on a purchaser's specifications.

In the example shown in FIG. 5, an ALDL connector 52 of the vehicle 12 is electrically connected with a microprocessor ALDL connector 54, which is electrically connected with a microprocessor 56. In this example, there would be no need for modifications to the vehicle's components (e.g., no drilling or grinding, etc.). The ALDL connector 52 supplies voltage to power the microprocessor and provides real-time vehicle speed data as an input. The ALDL connector 52 constantly supplies power from the vehicle, such as a 12 volt power supply, to the microprocessor, even when the engine is off. The microprocessor 56 is electrically connected with the computer 13, such as using a USB port 16 or other port, with a cable 17. In one embodiment, the software running on the computer 13 monitors the presence of the microprocessor 56. In some cases, the software could monitor the presence of a serial number or other indicator stored in the microprocessor 56. When the serial number or other indicator stored in the microprocessor 56 is not detected, certain input/output devices and/or functionality of the software could be disabled or restricted.

In some cases, such as in an emergency situation, an officer or other authorized personnel can override the system. For example, an override feature may be provided that overrides restrictions placed on the on-board computer if the system is put into an emergency mode, which restores complete functionality to the on-board computer regardless of the processor and speed data received from the ALDL. This could be done, for example, by breaking the electrical connection between the on-board computer 13 and the microprocessor 56 or ALDL connector 52, such as by pulling the cable 17 out of the USB port 16. As with the override described above with respect to other embodiments, a tamper-indicating seal may be provided to detect use of the override when emergencies or extenuating circumstances do not exist. For example, a tamper-proof seal could be provided at the connections between the ALDL connector 52 and microprocessor 56 and/or the USB port 16 and microprocessor 56.

Figure 6:
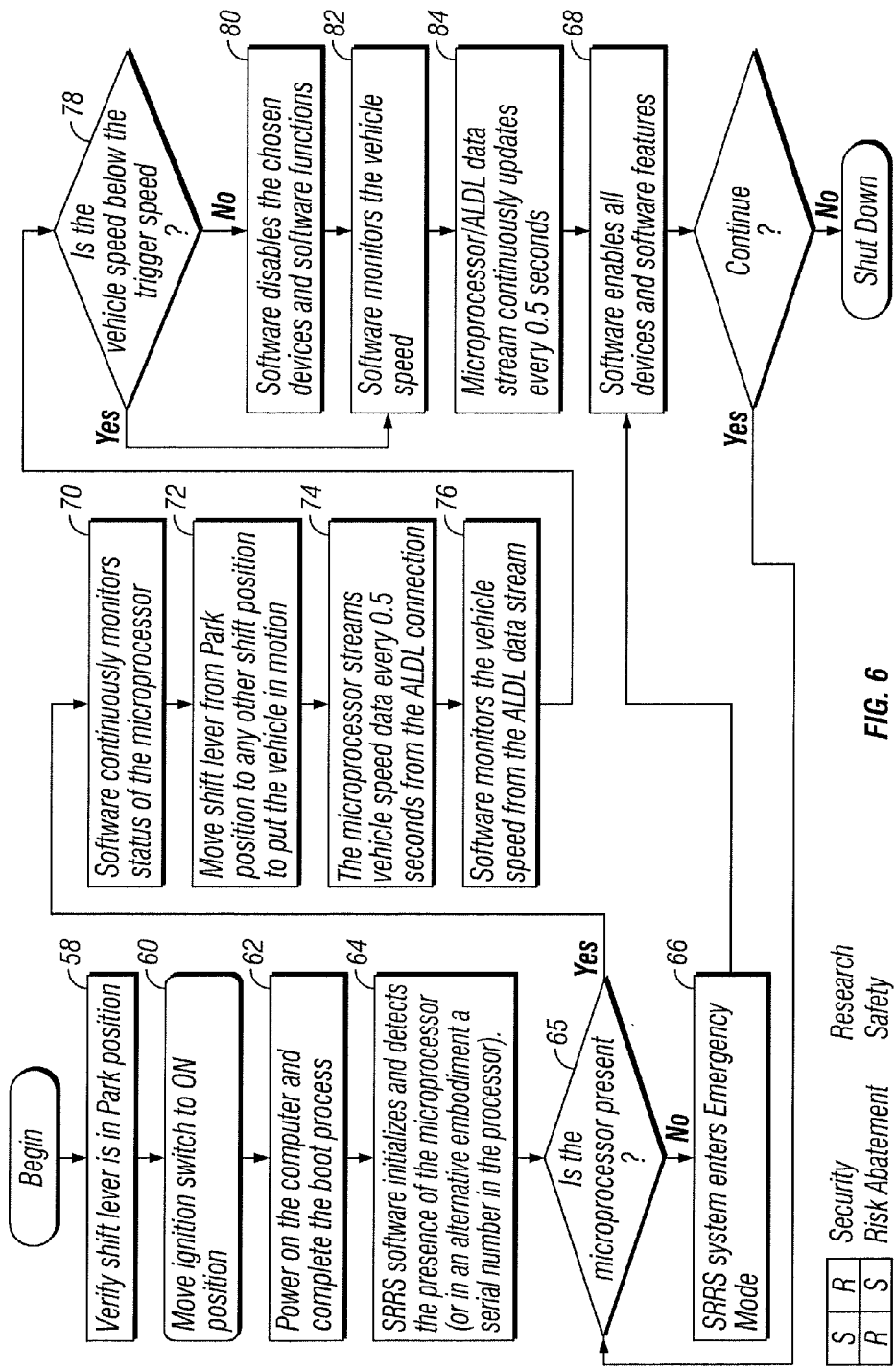
FIG. 6 is a flow chart which illustrates the method and operation of the alternative embodiment of FIG. 5.

FIG. 6 is a flow chart that shows the operation of the system in an embodiment such as FIG. 5. The user verifies that the vehicle's shift lever is in the Park position. (Block 58). Once this is verified, the user moves the ignition switch to the On position (Block 60), which powers up the computer and completes the boot process. (Block 62). The software initiates and detects whether the microprocessor 56 is present. (Block 64). In some cases, for example, this could be done by monitoring the microprocessor for a serial number or other indicator stored on the microprocessor 56. A determination is made as to whether the microprocessor 56 was detected. (Block 65). If the microprocessor is not present, the system enters into the emergency mode (Block 66) in which all hardware/software functionality is available/restored for the operator. (Block 68). This mode continues until a determination is made that the microprocessor 56 is present. Once the microprocessor 56 is detected, the system continues to monitor the status of the microprocessor 56. (Block 70). When the user moves the shift lever away from Park (Block 72), the microprocessor 56 makes available speed data from the ALDL. (Blocks 74 and

76). For example, in one embodiment, vehicle velocity or speed data could be continuously sent at 0.5 second intervals by the microprocessor 56. A determination is made whether the vehicle velocity is greater than a trigger speed, such as zero (or a speed greater than zero if a customer specifies a "speed limit" in some embodiments that allow functionality at low speeds). (Block 78). If the speed is greater than the trigger speed, the software disables or restricts predetermined computer hardware and/or software features. (Block 80). The speed continues to be monitored based on ALDL data made available by the microprocessor 56. (Blocks 82 and 84). When the vehicle is brought to a stop and velocity is below the trigger speed, the software reinstates the disabled/restricted functions. (Block 68).

Prior to installation, the purchaser selects which hardware/software functionality will be disabled or restricted, and after installation, these cannot be altered by the operator. In one embodiment, the program is compiled by AutoIt™ of AutoIt Consulting Ltd of England (www.autoitconsulting.com) that runs as a program in Microsoft Windows™.

Figure 7:
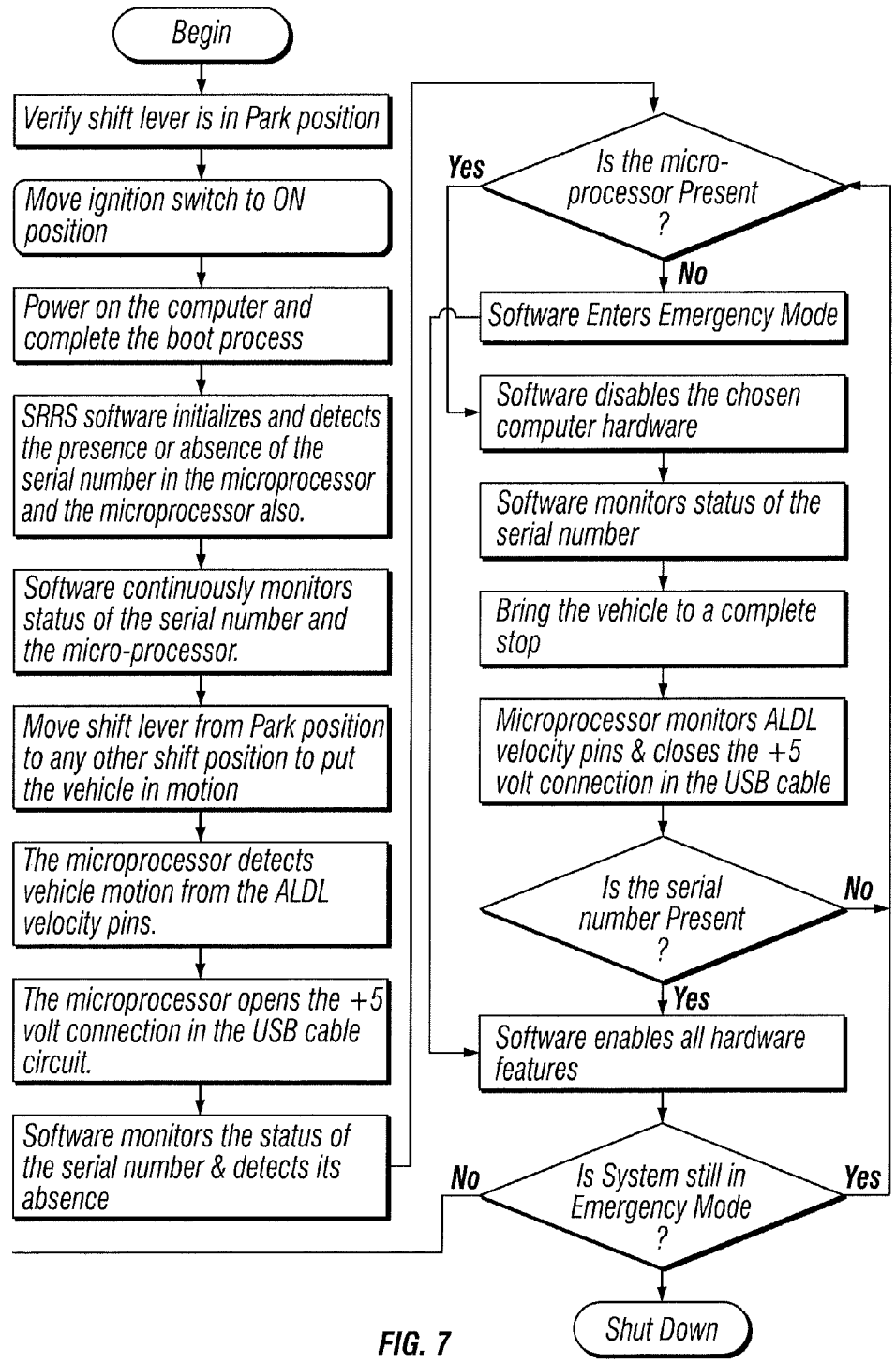
FIG. 7 is a flow chart which illustrates the method and operation of the alternative embodiment of FIG. 5 according to another aspect.

In one embodiment, the method and operation of which are shown in FIG. 7, the software could be programmed so that no computer components are disabled/restricted if a serial number stored in the microprocessor is present; if the serial number is absent and the microprocessor 56 is present, this means the vehicle is moving and so various hardware and/or software functions are disabled or restricted. The vehicle's operator has no control over the software and, therefore, no control over the disabled components. When the serial number is present, the disabled hardware/software functions are re-enabled.

Figure 8:
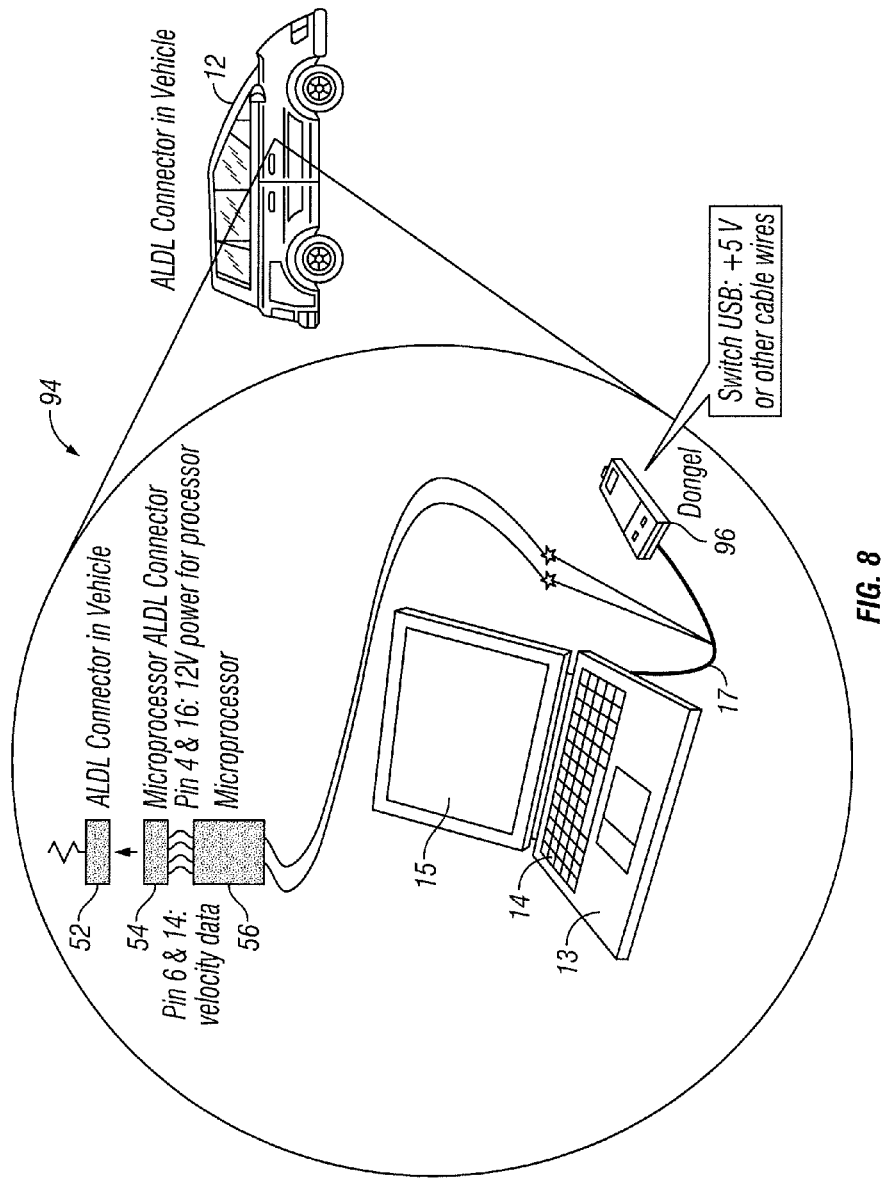
FIG. 8 shows an alternative embodiment.
Figure 9:
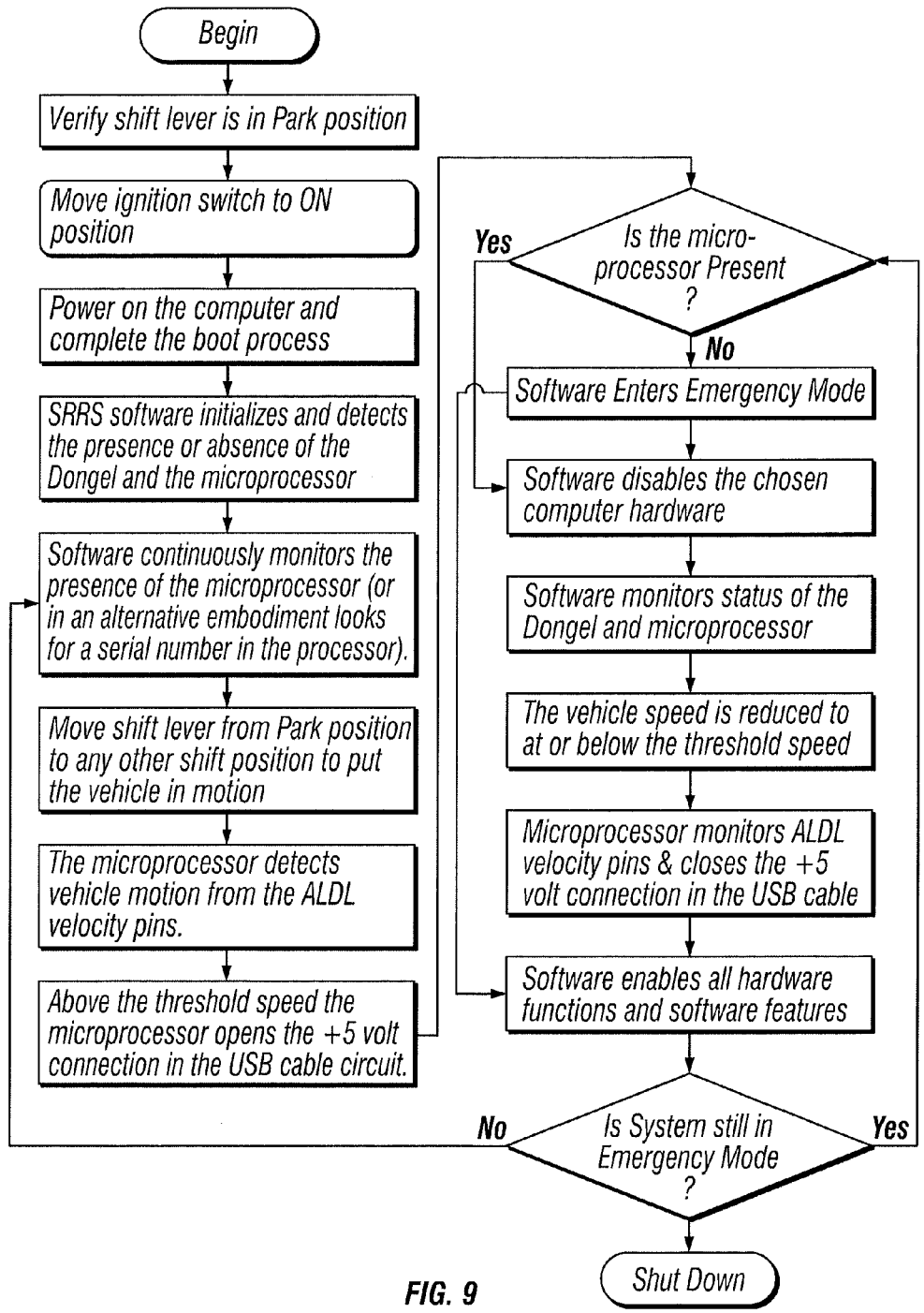
FIG. 9 is a flow chart which illustrates the method and operation of the alternative embodiment of FIG. 7.

FIG. 8 shows an alternative embodiment 94 similar to that in FIGS. 5 and 6, but in this embodiment the presence of a dongle 96, such as a unique code stored on the dongle, is monitored rather than a unique code stored on the microprocessor to determine whether to restrict and/or disable input/output devices and/or functions of the software running on the on-board computer. When the vehicle 12 is in motion, as detected by the microprocessor 56 using ALDL data, the microprocessor 56 is configured to disconnect the dongle 96 from the circuit. If the dongle 96 is not detected, the predefined input/output devices and/or functions of the software running on the on-board computer 13 will be disabled or restricted. When the vehicle 12 comes to a stop, the microprocessor re-connects the dongle 96 to the circuit, which restores full functionality of the on-board computer 13. In one embodiment, for example, a first connector is electrically coupled between the microprocessor 56 and the computer 13 and a second connector is electrically coupled between the microprocessor 56 and the dongle 96. When velocity data from the ALDL is greater than zero (or greater than a selected threshold/trigger speed), the processor 56 opens the +5 volt lead in the USB cable. This disconnects the dongle 96 from the circuit and the predetermined functions are restricted or disabled. When the velocity is zero (or below the threshold/trigger speed), the processor 56 closes the circuit, which allows the dongle 96 to be detected by the computer 13 and full functionality is restored to the computer 13. If an emergency exists, the restrictions can be bypassed or overridden by breaking a seal on the dongle 96 and inserting the dongle 96 directly into the USB port of the computer 13. FIG. 9 further illustrates the method and operation of the embodiment of FIG. 10.

As discussed above, the hardware/software functionality of the computer 13 that will be disabled or restricted when the vehicle is in motion can be selected by the purchaser of the system prior to installation, and after installation, these can not be altered by the operator. FIGS. 10 and 11 illustrate a possible arrangement by which selected functions of software could be restricted. FIG. 10 shows the on-board computer with full functionality. There are several top level screens with various functions that can be selected by the operator using various input devices, which can lead to sub-screens with additional functions depending on the selections of the operator. As discussed above, in some embodiments the input devices, such as a touch screen, mouse and keyboard, could be completely disabled, which means the operator would be unable to select any of the top level screens 98 or other sub-screens 100. In other words, the operator could only view the computer's display (if this is not disabled), but would be unable to interact with the computer 13.

Embodiments are also contemplated in which certain software functionality could be restricted instead of the input devices being disabled. FIG. 11 illustrates an example of such an embodiment. In this example, certain functions are restricted, which are indicated by being crossed-out, while other functions remain functional and could be used while the vehicle is in motion. In this example, the operator would be unable to select Function 1 or any sub-screens; however, the operator could be able to select Function 2 and Function N. As shown in this example, however, certain sub-screens could be restricted, such as sub-screen 2 of Function 2 when the vehicle is in motion. The exact configuration as to which function(s) remain available and which are restricted can be selected prior to installation. This provides flexibility so that different departments or precincts could be configured differently based on the desires of those departments or precincts.

Figure 12:
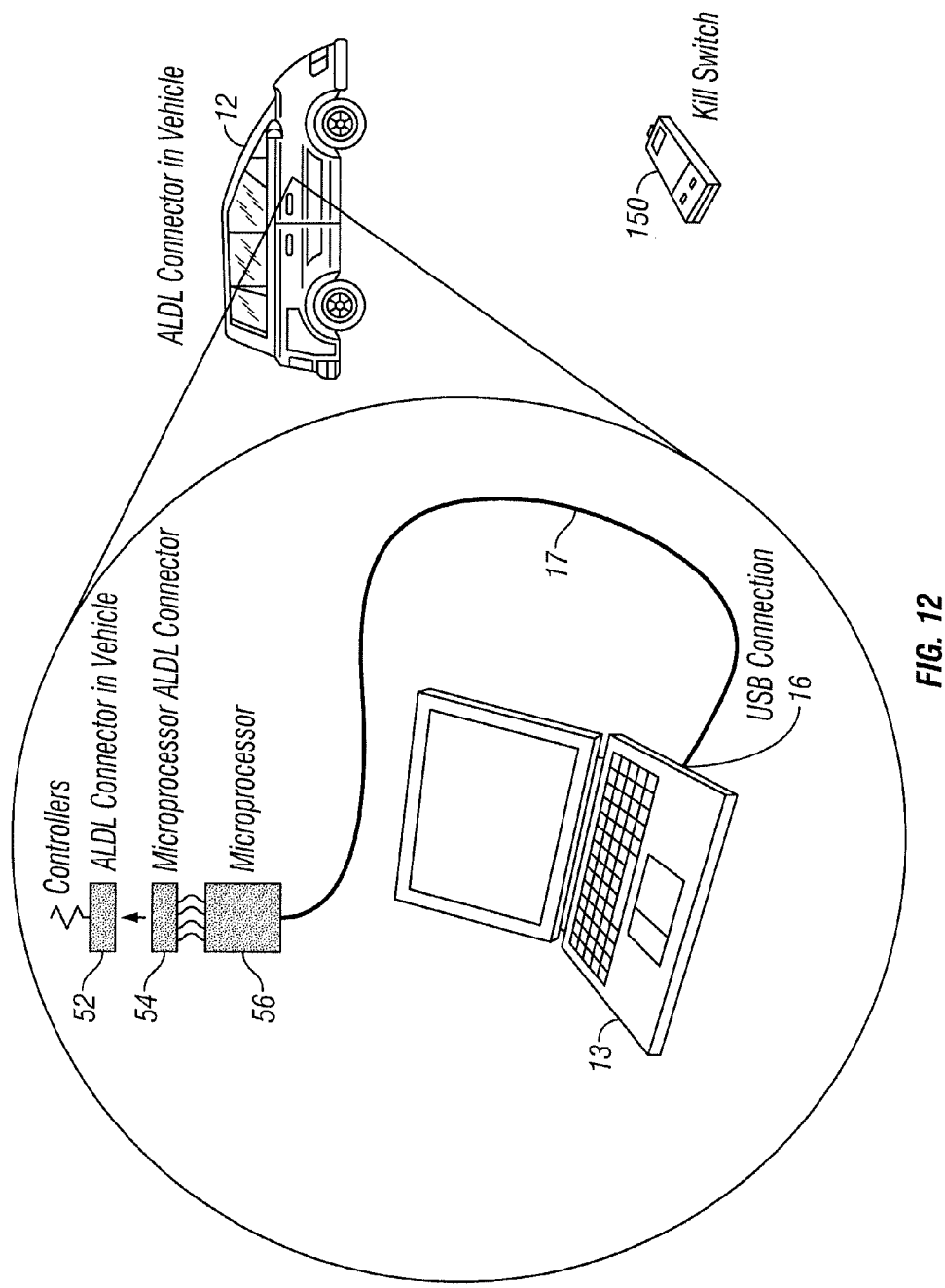
FIG. 12 shows another alternative embodiment of the invention.
Figure 13:
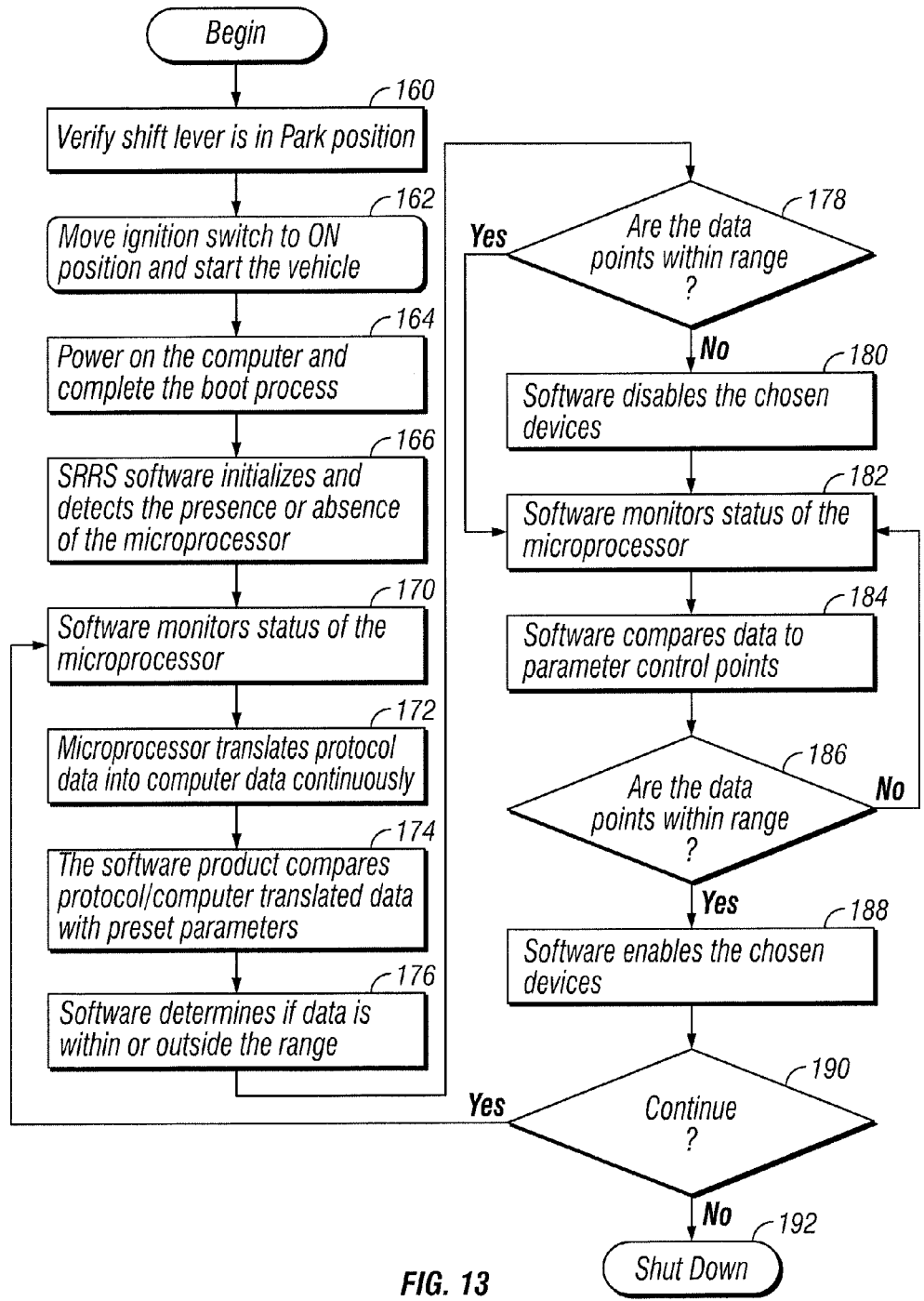
FIG. 13 is a flow chart which illustrates the method and operation of the alternative embodiment of FIG. 12.

FIGS. 12 and 13 show an alternative embodiment using vehicle status data from the vehicle's OBD to restrict/disable the computer. In the example shown, an ALDL connector 52 of the vehicle 12 is electrically connected with a microprocessor ALDL connector 54, which is electrically connected with a microprocessor 56. The microprocessor 56 is electrically connected with the computer 13, such as using a USB port 16 or other port, with a cable 17. In one embodiment, the software running on the computer 13 monitors the presence of the microprocessor 56 and data received from the microprocessor to restrict/disable functions of the computer. In some embodiments, for example, the system is tamper-proof by restricting/disabling computer functionality if the connection between the computer 13 and the ALDL is interrupted. This prevents the system from being overridden by the user unless the user has administrative rights or a "kill switch" as discussed below.

As with the embodiment in FIG. 5, there would be no need for modifications to the vehicle's components (e.g., no drilling or grinding, etc.). The ALDL connector 52 provides real-time vehicle status data from the vehicle's OBD system received from the vehicle's controllers, including but not limited to vehicle status data received from any of four vehicle controllers: engine, transmission, anti-lock brake controllers, and vehicle body controller. Based on the vehicle status data received from these controllers, the system will prevent operation of input devices (e.g., keyboard, mouse and/or touch-screen) and/or output devices (e.g., screen) and/or possibly reduced/disabled functionality of software running on the computer 13 depending on the circumstances and customized selection of the functions/devices that are selected to be disabled/restricted by the end user prior to installation of the system. In some cases, windows that are deemed non-critical or distracting may be minimized while the vehicle status data is outside a preset range. For example, a window for viewing text messages may be viewed as distracting and could be minimized when the vehicle status data is outside the preset range. Accordingly, a user may be able to see that text messages have been received from the minimized window, but would need to stop the vehicle to read the messages. In this manner, the user would still be able to view other windows, but those deemed distracting would be minimized while the vehicle status parameters are outside the preset range.

For example, in one embodiment, the software may send a query to the microprocessor 56 for vehicle status data regarding the engine, such as real-time RPM data or real-time speed data. This could be used, for example, to determine whether the vehicle speed exceeds a preset speed. By way of another example, the software could send a query to the microprocessor 56 for the real-time status of the transmission to determine which gear the vehicle is in. This could be used, for example, to restrict/disable functionality unless the vehicle is in "Park" or "Neutral." In another example, the software could send a query to the microprocessor 56 to determine the real-time status of the anti-lock brake controllers, which could be used to determine whether the vehicle's wheels are rotating. In some cases, the anti-lock brake controllers could be used to determine whether there are hazardous driving conditions, such as different wheel speeds indicating slipping. In some cases, for example, the software could restrict/disable access on the computer 13 unless the vehicle wheels are not moving. By way of a further example, the software could send a query to the microprocessor 56 to determine the real-time status of the vehicle body controller, which could be used to determine whether the driver's seat belt is locked. For example, the software could restrict/disable functionality of the computer 13 if the driver's seatbelt is not locked. In some embodiments, one or more of these controllers could be used to determine restrictions of the computer 13. For example, restrictions could be in place if the seatbelt is not latched even if the vehicle speed is below a preset threshold. In some cases, the software may be configured to periodically poll the microprocessor on one or more of the types of vehicle status data, such as every second or multiple times per second.

The microprocessor is configured to translate the query from the software into a message readable by the vehicle's OBD system. For example, the microprocessor 56 could translate the message into a message formatted according to a protocol for the vehicle's OBD system. By way of example only, the microprocessor 56 could translate the query from the software into a message for the vehicle's OBD system using one or more of the following standard protocols: ISO15765-4 (CAN), ISO14230-4 (Keyword Protocol 2000), ISO9141-2 (Asian, European, Chrysler vehicles), J1850 VPW (GM vehicles) and/or J1850 PWM (Ford vehicles). The translated message is sent from the microprocessor 56 to the vehicle's OBD system. The OBD system sends a response, which is received by the microprocessor via the ALDL connector 52. The microprocessor 56 translates this message into a format that is expected (or readable) by the software and sends a response to the query. Upon receiving the response from the microprocessor 56, the software may restrict/disable functionality if one or more of the parameters are outside preset parameters. In the embodiment shown, the only connection to the vehicle 12 is the connection to the ALDL connector 52, which supplies power (e.g., 12 volts) to the microprocessor 56 and vehicle status data to the microprocessor 56 from the OBD system.

In some embodiments, the software may be overridden with a kill switch 150 or by having access to administrator rights on the computer. In some embodiments, for example, the kill switch could be a USB thumb drive with a unique identifier or code stored thereon. The software could be configured to terminate operation if a thumb drive having the unique identifier is mounted to the computer 13.

FIG. 13 shows example steps that could be performed during operation of the system according to one embodiment. In this embodiment, the user verifies that the vehicle's shift lever is in the Park position. (Block 160). Once this is verified, the user moves the ignition switch to the On position (Block 162), which powers up the computer and completes the boot process. (Block 164). The software initiates and detects whether the microprocessor 56 is present. (Block 166). In some cases, for example, this could be done by monitoring the microprocessor for a serial number or other indicator stored on the microprocessor 56. The system monitors the status of the microprocessor 56. (Block 170). The microprocessor 56 reads vehicle status data, which is received from the vehicle's OBD via the ALDL connector 52 and continuously translates this into a data format that is computer readable by the software. (Block 172). The software running on the computer 13 compares the data received from the microprocessor 56 with preset parameters to determine whether the data is within or outside the preset range (Blocks 174 and 176). A determination is made whether the data is within the preset range (Block 178). If not, the software disables/restricts the selected functionality/devices. (Block 180). If so, the software monitors the status of the microprocessor 56. (Block 182). The software continues to compare the data received from the microprocessor 56 to determine whether the data is within the preset range. (Blocks 184 and 186). Any disabled/restricted devices or functionality will continued to be restricted or disabled until the data is within the preset range. At that point, the computer is restored or enabled to full functionality. (Block 188). This process continues (block 190) until the computer is shutdown (block 192).

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. An apparatus for use in selectively restricting functionality of a vehicle-mounted computer in a public service vehicle responsive to a vehicle status, the apparatus comprising:

a tangible computer program product executable on a computer for restricting functionality of the vehicle-mounted computer responsive to a vehicle status being outside a preset parameter;

a microprocessor in communication with an onboard diagnostic ("OBD") system of the public service vehicle, wherein the microprocessor is programmed to translate a query message for a vehicle status of one or more parameters of the public service vehicle received from the computer into a protocol readable by the OBD system of the public service vehicle and translate a response message received from the OBD system into a vehicle status message containing the vehicle status in format readable by the computer program product;

wherein the computer program product is configured to periodically query the microprocessor for a vehicle status of one or more parameters of the public service vehicle and restrict one or more functions of the vehicle-mounted computer responsive to the vehicle status received from the microprocessor being outside a preset parameter; and, wherein the computer program product is configured to be overridden with a kill switch or administrator rights on the computer wherein the one or more restricted functions can be overridden.

2. The apparatus as recited in claim 1, where the tangible computer program product is configured to send a query message to the microprocessor for a vehicle status of an engine controller of the public service vehicle and restrict functionality of the vehicle-mounted computer responsive to a speed or RPM being outside a preset range.

3. The apparatus as recited in claim 1, where the tangible computer program product is configured to send a query message to the microprocessor for a vehicle status of a transmission controller of the public service vehicle and restrict functionality of the vehicle-mounted computer responsive to the transmission being in a other than "Park" or "Neutral".

4. The apparatus as recited in claim 1, where the tangible computer program product is configured to send a query message to the microprocessor for a vehicle status of anti-lock break modules of the public service vehicle and restrict functionality of the vehicle-mounted computer responsive to a wheel speed being outside a preset range.

5. The apparatus as recited in claim 1, where the tangible computer program product is configured to a query message to the microprocessor for a vehicle status of anti-lock break modules of the public service vehicle and restrict functionality of the vehicle-mounted computer responsive to a differential in wheel speed indicating hazardous conditions.

6. The apparatus as recited in claim 1, where the tangible computer program product is configured to send a query message to the microprocessor for a vehicle status of a vehicle body controller of the public service vehicle and restrict functionality of the vehicle-mounted computer responsive to a driver's seat belt being unfastened.

7. The apparatus as recited in claim 1, wherein the tangible computer program product is configured to send a query message to the microprocessor for at least two of the following controllers: (1) engine; (2) transmission, (3) anti-lock brakes; and (4) vehicle body controller.

8. The apparatus as recited in claim 7, wherein the tangible computer program product is configured to restrict functionality of the vehicle-mounted computer responsive to a status of at least one of the multiple controllers being outside a preset range.

9. The apparatus as recited in claim 1, wherein the microprocessor is in communication with the OBD system via an ALDL connector which also supplies power to the microprocessor.

10. The apparatus as recited in claim 1, wherein the computer program product enters into a lockout mode responsive to the computer being electrically decoupled from one or more of the microprocessor and the OBD system, wherein the computer program product restricts functionality of the vehicle-mounted computer responsive to entering the lockout mode.

11. The apparatus as recited in claim 1, further comprising a memory device having stored therein a unique identifier mountable with the computer, wherein the computer program product is configured to terminate responsive to the memory device being mounted with the computer.

12. The apparatus as recited in claim 1, wherein the computer program product is configured to disable one or more input devices of the vehicle-mounted computer responsive to the vehicle status being outside a preset parameter.

13. The apparatus as recited in claim 1, wherein the computer program product is configured to disable at least one of a keyboard, a mouse, and a touch-screen associated with the vehicle-mounted computer responsive to the vehicle status being outside a preset parameter.

14. The apparatus as recited in claim 1, wherein the computer program product is configured to disable one or more output devices of the vehicle-mounted computer responsive to the a vehicle status being outside a preset parameter.

15. The apparatus as recited in claim 1, wherein the computer program product is configured to disable one or more software functions of a program executing on the vehicle-mounted computer responsive to the vehicle status being outside a preset parameter.

16. A computerized method of selectively restricting functionality of a vehicle-mounted computer in a public service vehicle responsive to a vehicle status, the method comprising the steps of:
   detecting a status of the public service vehicle by periodically querying an onboard diagnostic ("OBD") system of the public service vehicle during operation of the vehicle;
   monitoring, on a computer, whether the public service vehicle is outside a preset parameter based on data received from the OBD system;
   responsive to determining that the data received from the OBD system is outside the preset parameter, restricting one or more functions of the vehicle-mounted computer; and
   responsive to an interruption in an electrical connection between the vehicle-mounted computer and the OBD system, restricting one or more functions of the vehicle-mounted computer.

17. The method as recited in claim 16, further comprising the step of translating between a first format readable by the OBD system and a second format readable by the computer.

18. The method as recited in claim 16, wherein one or more of the following controllers accessible by the OBD system are queried to determine the status of the public service vehicle: (1) engine; (2) transmission, (3) anti-lock brakes; and (4) vehicle body controller.

19. The method as recited in claim 18, wherein restriction of one or more functions of the vehicle-mounted computer is responsive to a speed exceeding a preset threshold.

20. The method as recited in claim 16, further comprising the step of terminating any restriction in place responsive to mounting of a memory device in the computer that has stored a unique identifier.

* * * * *